P. E. CRANSTON.
MILK COOLER.
APPLICATION FILED JULY 3, 1914.
1,172,877.
Patented Feb. 22, 1916.
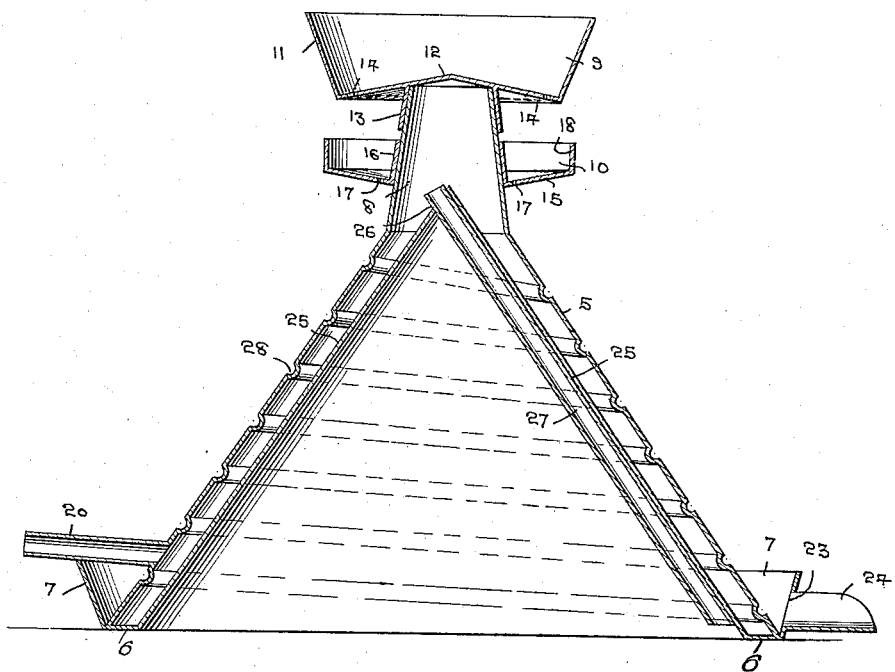
Witnesses
Inventor
P. E. Cranston
By
Attorney

UNITED STATES PATENT OFFICE.

PATTERSON E. CRANSTON, OF RICHLAND CENTER, WISCONSIN.

MILK-COOLER.

1,172,877.

Specification of Letters Patent.

Patented Feb. 22, 1916.

Application filed July 3, 1914. Serial No. 849,005.

*To all whom it may concern:*

Be it known that I, PATTERSON E. CRANSTON, a citizen of the United States, residing at Richland Center, in the county of Richland and State of Wisconsin, have invented certain new and useful Improvements in Milk-Coolers; and I do hereby declare the following to be a full, clear, and exact description of the invention, such as will enable others skilled in the art to which it appertains to make and use the same.

This invention relates to appliances for the cooling of milk and particularly partakes of the nature of improvements over that construction of milk coolers for which Letters Patent 1,089,692 were granted to me on March 10, 1914.

As a principal object this invention contemplates the provision of a cooler of conical formation in which special provision is made to expose a larger portion of the surface adapted to be traversed by the milk to the action of the cooling agent than has been heretofore known.

A further object is to provide means formed upon the deflector disk disclosed in the above mentioned patent whereby all of the milk will be forced to pass over the entire cooling surface of the cooler thus obviating a difficulty heretofore met with and to also provide a practical means for the escape of the cooling agent.

The above and additional objects are accomplished by such means as are illustrated in the accompanying drawing, described in the following specification and then more particularly pointed out in the claim which is appended hereto and forms a part of this application.

With reference to the drawing, wherein I have illustrated the embodiment of my invention as it is reduced to practice, and throughout which like characters of reference designate similar parts, the figure shown is a vertical sectional view through a form of cooler by the use of which the foregoing objects may be accomplished.

Proceeding now to the description of the drawing and having particular reference to the figure, the numeral 5 indicates the lateral surface of the outer cone having the bottom 6 and an outer peripheral flange 7 formed integral therewith. The upper portion of the outer cone 5 terminates in an upstanding tubular portion or conical neck 8 which tapers from the bottom to the top and is adapted to carry or support in a manner somewhat similar to that disclosed in my previous mentioned patent a reservoir 9 and a deflector cup 10.

The reservoir 9 is formed with the preferably frusto conical wall 11 and a conical bottom 12 sloping from the center of the reservoir downwardly and outwardly to the point of connection with the wall 11, while the bottom 12 is also adapted to carry the depending integral sleeve 13 to engage with the upper portion of the tubular member 8 in such a manner as to firmly secure the reservoir thereupon. Suitable apertures 14 are provided in the bottom 12 at a point immediately interior of the wall 11 and are adapted to convey the milk which the reservoir 9 is designed to contain, downwardly into the deflector cup 10. This deflector cup is provided with a conical bottom 15 oppositely disposed to the bottom of the reservoir and carries the upstanding sleeve 16 whereby the cup is removably positioned upon the tubular member 8. Suitable apertures 17 are formed in the bottom of the cup near the base of the upstanding sleeve 16 in such manner that the milk received from the reservoir may be transmitted directly to the upper portion of the outer cone 5 and the annular flange 18 is formed upon the outer edge of the cup to serve a purpose to be hereinafter more fully described. The outer cone 5 is preferably formed of some light sheet metal which may be peculiarly conductive of cold and is formed with the spiral glove 28 having its convolutions accordingly spaced apart. The inlet pipe 20 through which the cooling agent is admitted to the interior of the outer cone 5 connects therewith near the bottom 6. The flange 7 which forms a gutter around the base of the cooler is suitably apertured as at 23 to receive the outlet spout 24 through which the milk after being cooled is adapted to be drained out into the desired receptacle. Within the outer cone 5 and secured to the bottom 6 thereof is the inner cone 25 which unlike that construction disclosed in my above mentioned patent does not contact with the outer cone 5 or with the grooves 19 formed therein. This inner cone 25 has the further point of difference from the above named patent in that its apex is not broken off but is apertured as at 26 to receive the escape pipe 27 which is secured to the inner wall of this cone and projects through the top thereof into the tubular portion 8. The escape pipe 27 communicates at one of its ends with the spaced top left between the two cones and has its opposite end leading to the exterior of the cooler adjacent its bottom.

The operation of my device by which the milk is permitted to come in contact with a larger portion of the conical surface of the outer cone 5 which has been subjected to the action of the cooling agent is as follows. The inlet pipe 20 which is adapted to be connected to a suitable source of water or other cooling liquid supply conducts the water to the interior of the outer cone 5 thus permitting the cooling agent to come in contact with the inner surface of the outer cone 5 by filling the hollow space between the outer cone 5 and inner cone 25 until the water level rises above the escape pipe 27 through which it is then conducted to the exterior of the cooler to make room for the entrance of fresh liquid through the pipe 20 since by the time the cooling agent reaches the tubular member 8 it has absorbed the heat calories of the milk flowing on the outer surface of the outer cone and has accordingly no further utility. The milk with which the reservoir 9 is filled passes downwardly into the deflector cup 10 through the apertures 14 and thence passes through the aperture 17 to outer surface of the outer cone and instead of traversing grooves such as disclosed in my patent already referred to is permitted to flow directly into the gutter provided by the flange 7 from which it may be drained off through the outlet 24. By this means the outer surface of the outer cone which is disposed between the grooves is of equal service as the grooves themselves in cooling the milk, a condition not utilized heretofore.

In the construction previously described a much smaller quantity of cooling agent is needed owing to the provision of the inner cone 25. A portion of the milk will of course follow the path of the spiral groove but the intermediate surface 5 of the outer cone will also be brought into use owing to the shallowness of the groove so that the course pursued by the milk in passing from the reservoir 9 to the spout 24 will cover the entire outer surface of the outer cone while also spiraling around the cone to some extent, this spiral path thus permitting the milk to come in contact with the cool material for a longer space of time than is permitted by a more direct course.

The provision of the annular flange 18 formed upon the deflector cup 10 prevents any of the milk from flowing over the outer edge of the bottom 15 which if permitted would give the milk a much shorter time of contact with the cool surface of the outer cone, as the milk which would follow this course would reach the cool surface at a point some distance below that reached by the milk flowing through the regular channels afforded by the apertures 17.

While in the foregoing however, I have thus illustrated in the drawing and described in the specification such combination and arrangement of elements as constitute the preferred embodiment of my invention I desire to emphasize the fact that I may make such minor changes in the matters of proportion and degree, in later adaptations of my device as shall not alter the spirit of my invention as defined in the appended claim.

What I claim is:

A milk cooler, comprising an outer cone having shallow inwardly indented grooves therein, a conical neck upon the upper end of said cone, a reservoir upon said neck above said cone and disposed thereover, a deflector cup upon said neck beneath said reservoir for transmitting the milk flowing from said reservoir to the top of said cone to cause the milk to come in contact with all portions of the cooled surfaces of the cone, an inner cone within said outer cone and spaced therefrom to provide a compartment therebetween, said inner cone having a closed upper end extending into said neck, a bottom connecting the bases of said cones, means for filling said compartment between said cones with a cooling agent, means for receiving the cooled milk at the bottom of said outer cone, means for draining the milk from said receiving means, and an outlet pipe upon the inner wall of said inner cone projecting through the closed end of said inner cone and into said neck for conveying the warmer portions of said cooling agent from said neck to the exterior of said cooler.

In testimony whereof I have signed my name to this specification in the presence of two subscribing witnesses.

PATTERSON E. CRANSTON.

Witnesses:
 MAY ROBBINS,
 HATTIE TURNIPSEED.

Copies of this patent may be obtained for five cents each, by addressing the "Commissioner of Patents, Washington, D. C."